US008838773B1

(12) United States Patent
Sekhar et al.

(10) Patent No.: US 8,838,773 B1
(45) Date of Patent: Sep. 16, 2014

(54) DETECTING ANONYMIZED DATA TRAFFIC

(75) Inventors: Bharath Kumar Chandra Sekhar, Santa Clara, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1442 days.

(21) Appl. No.: 11/537,483

(22) Filed: Sep. 29, 2006

(51) Int. Cl.
G06F 15/173 (2006.01)

(52) U.S. Cl.
USPC .......................... 709/224; 709/223; 709/225

(58) Field of Classification Search
USPC ............................................. 709/224; 726/11
See application file for complete search history.

(56) References Cited

U.S. PATENT DOCUMENTS

| 6,321,267 | B1 | 11/2001 | Donaldson |
| 6,807,181 | B1 | 10/2004 | Weschler |
| 7,023,861 | B2* | 4/2006 | Makinson et al. ............ 370/401 |
| 7,047,425 | B2 | 5/2006 | Dubuque |
| 7,359,962 | B2 | 4/2008 | Willebeek-LeMair et al. |
| 7,493,403 | B2* | 2/2009 | Shull et al. .................... 709/229 |
| 7,539,186 | B2 | 5/2009 | Aerrabotu et al. |
| 7,606,214 | B1 | 10/2009 | Chandra Sekhar et al. |
| 7,707,305 | B2* | 4/2010 | Afek et al. .................... 709/238 |
| 7,716,729 | B2 | 5/2010 | Bhatia |
| 7,818,343 | B1 | 10/2010 | Sekhar et al. |
| 7,822,620 | B2* | 10/2010 | Dixon et al. .................. 705/1.1 |
| 7,849,502 | B1* | 12/2010 | Bloch et al. ..................... 726/11 |
| 7,890,612 | B2* | 2/2011 | Todd et al. .................... 709/220 |
| 7,913,302 | B2* | 3/2011 | Shraim et al. .................. 726/22 |
| 7,934,253 | B2* | 4/2011 | Overcash et al. ............... 726/22 |
| 7,975,306 | B2* | 7/2011 | Chess et al. ..................... 726/25 |
| 2002/0046170 | A1* | 4/2002 | Gvily .............................. 705/42 |
| 2002/0052841 | A1 | 5/2002 | Guthrie et al. |
| 2003/0182420 | A1 | 9/2003 | Jones et al. |
| 2004/0015586 | A1* | 1/2004 | Hegli et al. .................... 709/225 |
| 2004/0267610 | A1* | 12/2004 | Gossett et al. .................. 705/14 |
| 2004/0268147 | A1* | 12/2004 | Wiederin et al. .............. 713/201 |
| 2005/0060535 | A1 | 3/2005 | Bartas |
| 2005/0097179 | A1 | 5/2005 | Orme |
| 2006/0068755 | A1 | 3/2006 | Shraim et al. |
| 2006/0248452 | A1* | 11/2006 | Lambert et al. ............... 715/513 |
| 2006/0253458 | A1* | 11/2006 | Dixon et al. .................... 707/10 |
| 2006/0253580 | A1 | 11/2006 | Dixon et al. |
| 2006/0288076 | A1 | 12/2006 | Cowings et al. |
| 2007/0033264 | A1* | 2/2007 | Edge et al. .................... 709/217 |
| 2007/0130151 | A1* | 6/2007 | Wiles ............................ 707/10 |
| 2007/0130313 | A1* | 6/2007 | King ............................ 709/223 |
| 2007/0192855 | A1 | 8/2007 | Hulten et al. |
| 2007/0250468 | A1* | 10/2007 | Pieper ............................ 707/1 |
| 2007/0261112 | A1* | 11/2007 | Todd et al. ..................... 726/11 |
| 2008/0028463 | A1 | 1/2008 | Dagon et al. |

(Continued)

OTHER PUBLICATIONS

"U.S. Appl. No. 11/693,675", filed Mar. 29, 2007.

(Continued)

Primary Examiner — Umar Cheema
(74) Attorney, Agent, or Firm — IPSG, P.C.

(57) ABSTRACT

Computer implemented methods and apparatuses for detecting and/or blocking anonymized data even if the user employs a web server that is not known to the web filter to be an anonymizing web server (such as a user-hosted anonymizer). The anonymize attempt may be detected by monitoring for the HTTP 302 Moved message and parsing the HTTP 302 Moved message for URLs, which may then be checked for unapproved content. The anonymize attempt may, additionally or alternatively, be detected by looking the IP addresses in an IP address rating database to detect suspicious traffic.

19 Claims, 4 Drawing Sheets

(56) References Cited

U.S. PATENT DOCUMENTS

| | | |
|---|---|---|
| 2008/0080518 A1 | 4/2008 | Hoeflin et al. |
| 2008/0082662 A1 | 4/2008 | Dandliker et al. |
| 2008/0147857 A1 | 6/2008 | Oliver et al. |
| 2008/0244744 A1 | 10/2008 | Thomas et al. |
| 2008/0276316 A1 * | 11/2008 | Roelker et al. ............. 726/23 |

OTHER PUBLICATIONS

"Final Office Action", U.S. Appl. No. 11/693,675, Mailing Date: Feb. 11, 2011.

"Non Final Office Action", U.S. Appl. No. 11/693,675, Mailing Date: Jun. 11, 2010.

* cited by examiner

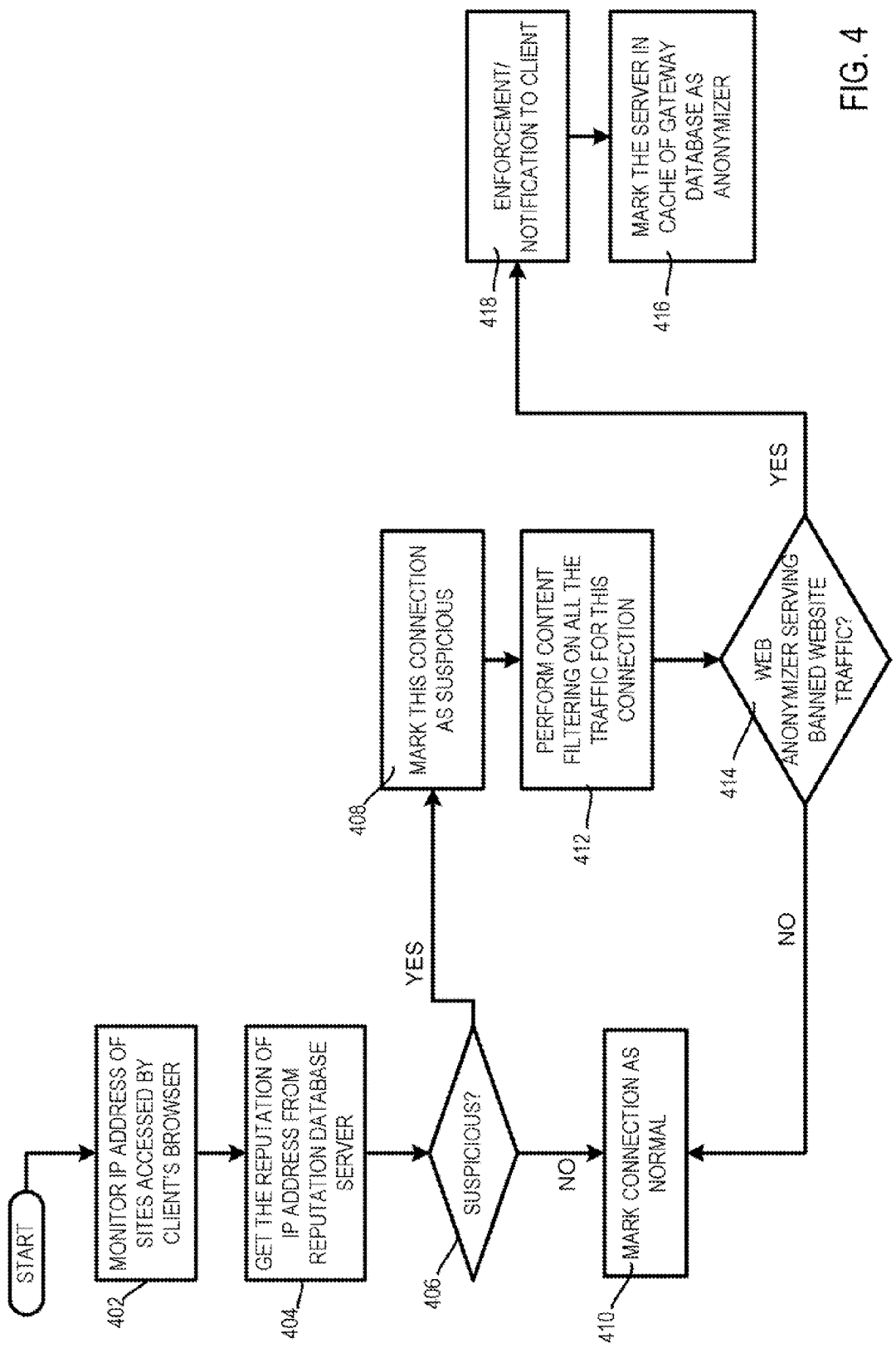

DETECTING ANONYMIZED DATA TRAFFIC

BACKGROUND OF THE INVENTION

As the Internet continues to evolve, increasingly greater volume and variety of data is becoming available to computer users. Most of the available data (which includes both renderable text/graphics/audio data and executables) is benign or at worst not useful when accessed by a user via the Internet. However, some of the data may be objectionable and/or malicious. Preventing intentional or unintentional access to the malicious data is an important task for administrators and parents alike.

One way to prevent access to potentially malicious data involves the use of web filters and in particular URL filtering. Generally speaking, URL filtering works by examining the URL and blocking access to websites that have been deemed to be prohibited. For example, some URL filtering products are implemented as software in web filter gateways and function by checking the URL (Uniform Resource Locator) of web pages that are sent to the user's browser. If the URL associated with a webpage is found to be associated with a prohibited website, the gateway would block that web page from reaching the user's browser. For example, if website XYZ131.com is a prohibited website, any web page that contains the string "www.xyz131.com" in its URL would be blocked by the web filter from reaching the user's browser.

Clever users attempt to bypass or confuse web filters by using anonymizers. There exist commercial websites offering anonymizer service to users. Instead of accessing the prohibited website directly, the user instead access the anonymizer website and employs the anonymizer website to perform the access to the desired destination site (e.g., the aforementioned xyz131.com). With some anonymizer sites, when the webpage is returned to the user, the URL of the webpage reflects the URL of the anonymizer website and not of the desired destination site (e.g., xyz131.com). Other anonymizer sites may alternatively or additionally encrypt the data, rendering it impossible for the web filters to ascertain the origin or content of the data.

Current solutions to combat anonymizers include blocking any data that is returned from known anonymizer sites, i.e., treating all data from known anonymizer sites as harmful. This approach is shown in prior art FIG. 1 wherein user 102 attempts via a browser to access destination website 104 via a commercially available anonymizing web server 106. In this case, a gateway 108 performs URL filtering on the data returned from anonymizing web server 106 would block all traffic from anonymizing web server 106, thus preventing data from prohibited destination website 104 from reaching user 102. In the example of FIG. 1, gateway 108 is implemented separately from a firewall 110 but these two functions may be implemented together in the firewall in some cases if desired.

However, this approach fails to detect data that has been anonymized by web servers that are not known to the web filtering software. For example, if an employee runs an anonymizer software on his home computer 112 as a user-hosted anonymizer software and accesses the anonymizer software from work to visit prohibited website 104, the anonymized data appears to the company's firewall at his work place as if that data comes from the employee's home computer 112. As such, the anonymized data is not blocked and web filtering is frustrated.

SUMMARY OF INVENTION

The invention relates, in an embodiment, to a computer-implemented method for detecting anonymized data traffic transmitted via a network device to a browser. The method includes monitoring packets traversing the network device for a "HTTP 302 Moved" message. The method includes ascertaining, if the "HTTP 302 Moved" message is detected, whether an embedded URL (Uniform Resource Locator) in the HTTP 302 Moved message includes a website address. The method additionally includes ascertaining, if the "HTTP 302 Moved" message is detected and using the website address, whether a given website associated with the website address contains unapproved content. The method further includes flagging, if the given website contains the unapproved content, traffic from a server that transmitted the HTTP 302 Moved message as potential anonymized traffic.

In another embodiment, the invention relates to a computer-implemented method for detecting anonymized data traffic transmitted from Internet servers to a browser. The method includes ascertaining IP addresses of the Internet servers and performing lookup of the IP addresses in an IP address rating database. The method includes flagging, if the lookup reveals one of the IP addresses to be associated with suspicious traffic, traffic associated with the one of the IP addresses as potential anonymized traffic.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

Prior art

FIG. 4 shows, in accordance with another embodiment of the invention, a computer-implemented method for detecting anonymized data.

DETAILED DESCRIPTION OF EMBODIMENTS

Figure 1:
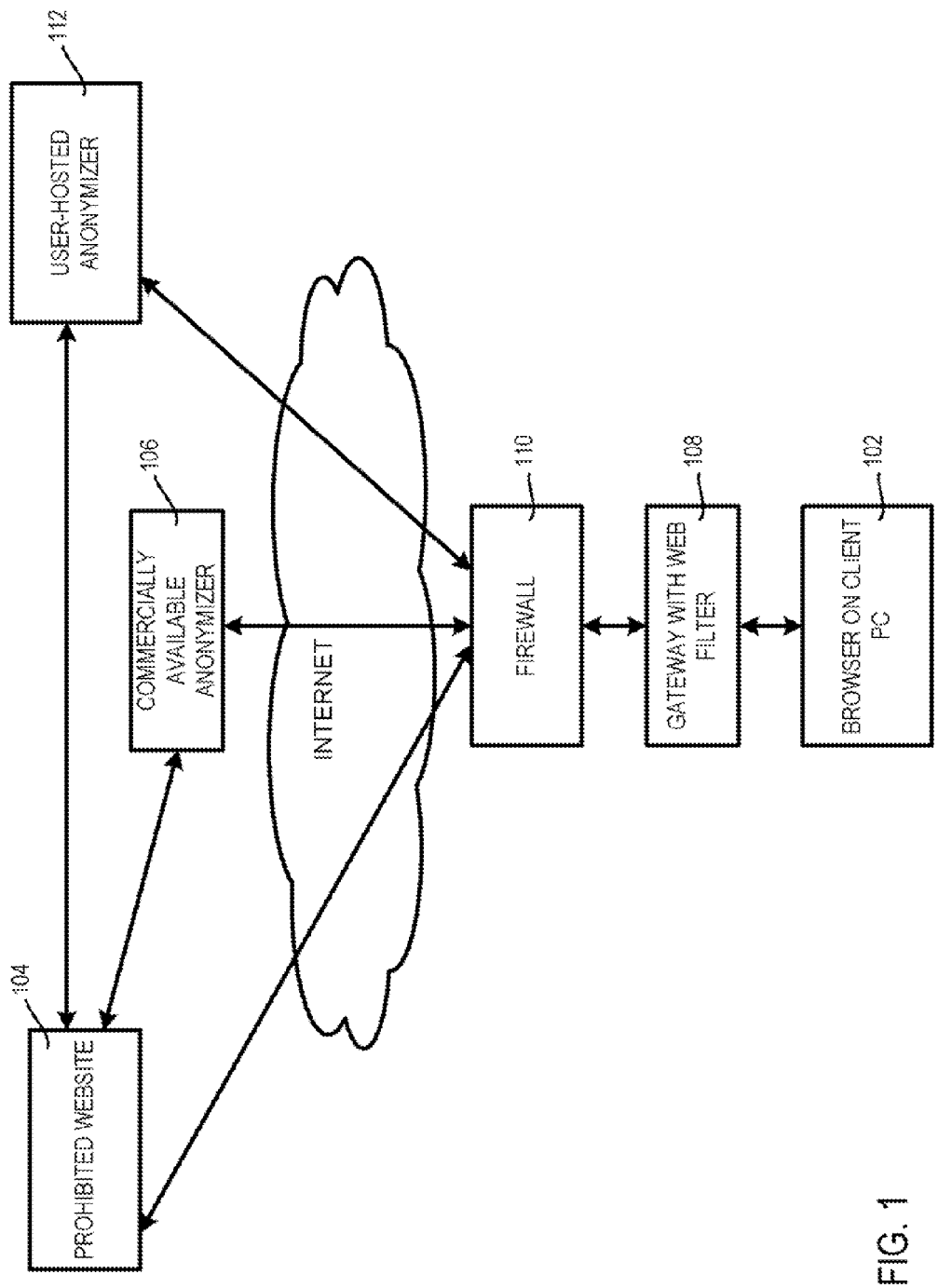
FIG. 1 illustrates a network environment to facilitate discussion of the anonymizer issue

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, optomagnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with an embodiment of the present invention, there are provided computer implemented methods and apparatuses for detecting and/or blocking anonymized data even if the user employs a web server that is not known to the web filter to be an anonymizing web server (such as a user-hosted anonymizer). In an embodiment, "HTTP 302 moved" messages destined to the user's web browser are monitored. If a HTTP 302 moved message that is destined for a user's web browser is detected and the content of the HTTP 302 moved message includes an embedded URL string associated with the URL of a prohibited website, traffic from the web server that provides the HTTP 302 moved message is flagged as possible anonymized traffic. Depending on the web filtering policy, all traffic from the web server that provides the HTTP 302 moved message may be blocked, or the traffic may be flagged so that the administrator may investigate further, for example.

In another embodiment, the IP address of sites accessed by the user's browser is monitored. These IP addresses are looked up in a rating database that tracks suspicious web server IP addresses, i.e., those that should be treated as suspicious if they act as web servers. For example, IP addresses that are not suitable for e-commerce, including for example dynamically allocated IP addresses, may be treated as suspicious when they act as temporary web servers. The database may be maintained by a third-party service over the Internet, allowing the gateways to lookup the IP addresses in real-time (with caching performed at the gateway to improve performance, if desired).

If the IP address of an accessed site is deemed suspicious, the connection is then monitored for prohibited content. For example, traffic associated with that connection may be content-scanned for unapproved traffic, e.g., words or phrases that suggest sex, pornography, etc. If prohibited content is detected, enforcement may take place and may include, for example, blocking all future traffic from the web server associated with that IP address. Additionally, the IP address of the web server that provides the prohibited content may be marked in the cache of the gateway database as an anonymizer. Additionally, the rating database may be updated so that if another user attempts to use the same web server to access a prohibited website, a lookup performed by that user's gateway against the rating server will suggest that the traffic be blocked.

Figure 2:
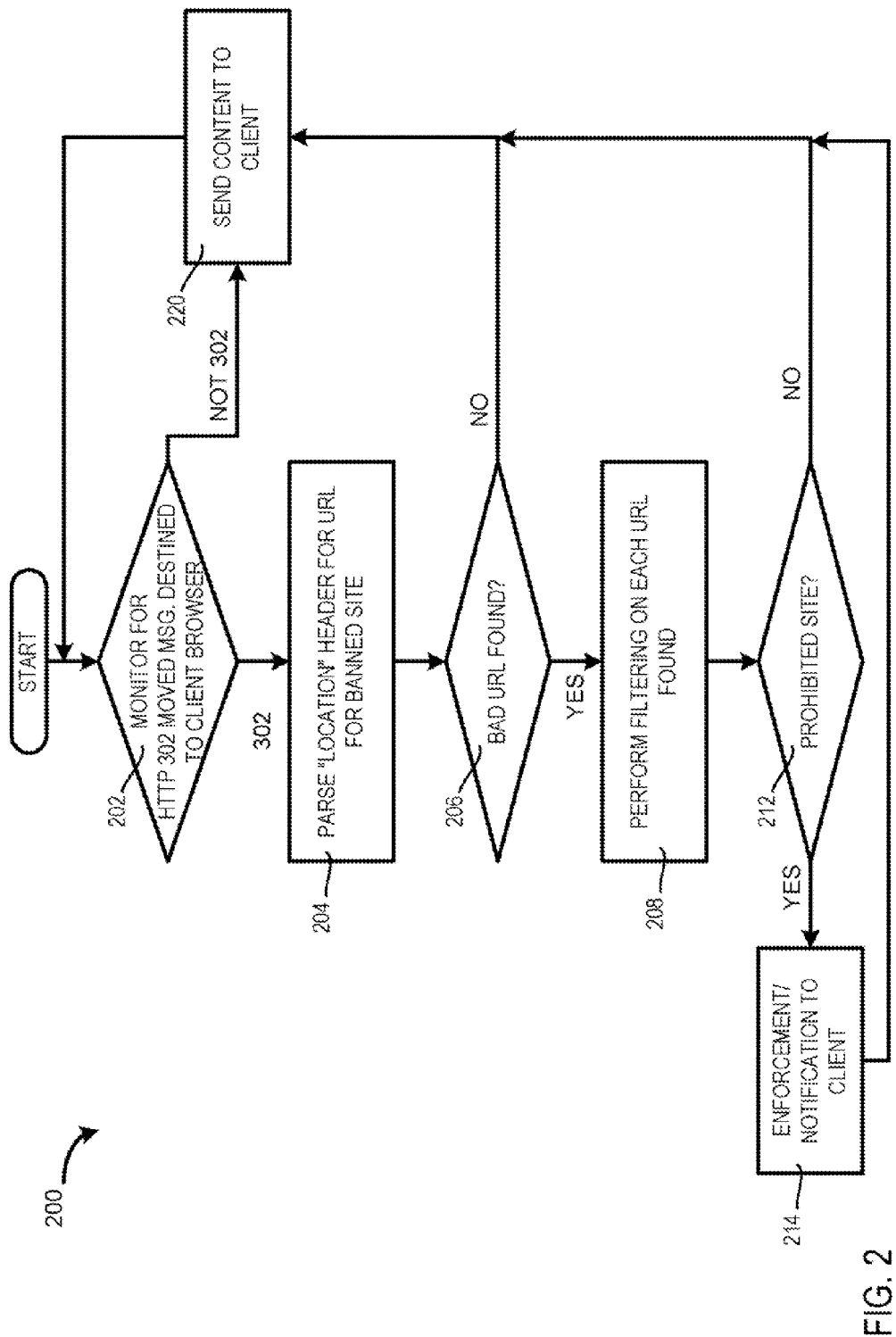
FIG. 2 shows, in accordance with an embodiment of the invention, a computer-implemented method for detecting anonymized data.

These and other features and advantages of the invention may be better understood with reference to the figures and drawings that follow. FIG. 2 shows, in accordance with an embodiment of the invention, a computer-implemented method 200 for blocking anonymized data. Generally speaking, method 200 is implemented by the network administrator or by an administrator of the firewall or gateway through which the user's internet traffic traverses. In step 202, the traffic destined for the user's browser is monitored for the "HTTP 302 moved" message.

The inventor herein observes that unencrypted anonymized traffic is often enabled in the following manner. First, the user employs a browser to access a web server that performs the anonymizing service. Assume for example that the URL for this anonymizing web server is www.sp15142.com.

Sp15142.com then provides the user with a form to fill out in which the user can specify the URL of the destination web site he wishes to access.

Suppose the user wishes to access the site "www.nogoodsite1234.com" At this point, the user's browser performs a HTTP post to the IP address of www.sp15142.com with the content including "www.nogoodsite1234.com".

The web server at www.sp15142.com than sends back to the user's browser a HTTP 302 moved message with the "Location" field in the HTTP header having the URL string "www.nogoodsite1234.com" For example, the "Location" field in the HTTP header of the HTTP 302 Moved message may read "http://www.sp15142.com/a100qw3/http/www.nogoodsite1234.com".

The user's browser then performs a HTTP get on this new URL to obtain the data (once the OK 200 message is received). Note that this data now bypasses the web filter since it appears as if the data is transmitted between the user's web browser and the web server at www.sp15142.com.

In step 204, the "Location" field of the HTTP 302 moved message is parsed (assuming that the HTTP 302 moved message is detected in step 202). In this case, the parsing searches the "Location" string of the HTTP 302 moved message for embedded URLs (e.g., the aforementioned www.nogoodsite1234.com) and performs (yes branch of step 206) content filtering on web pages received from that site. By way of example, the gateway may perform a URL Filtering lookup (step 208) or may access the destination website (e.g., the aforementioned www.nogoodsite.com) directly to ascertain whether the content received is of the type that is prohibited.

If the destination website is a prohibited website (yes branch of step 212), enforcement notification is provided (step 214) to the user and/or the administrator, informing that the attempted access is illegal.

On the other hand, if the destination website is not a prohibited site (no branch of step 212), the data is sent to the client's browser (step 220), reflecting the fact that the data is not found to be anonymized data. The data is also sent to the client's browser (step 220) if it is found in step 202 that the message is not a HTTP 302 moved message. Thereafter, control returns to step 202 to monitor the next message.

In some cases, the anonymizing web site actually encodes the URL of the destination website (e.g., of www.nogoodsite1234.com in the current example). Thus, www.nogoodsite1234.com may be encoded as "www.xyz5237.com". In these cases, a parsing of the HTTP 302 moved message would not result in the discovery of the attempt to access a prohibited website.

Figure 3:
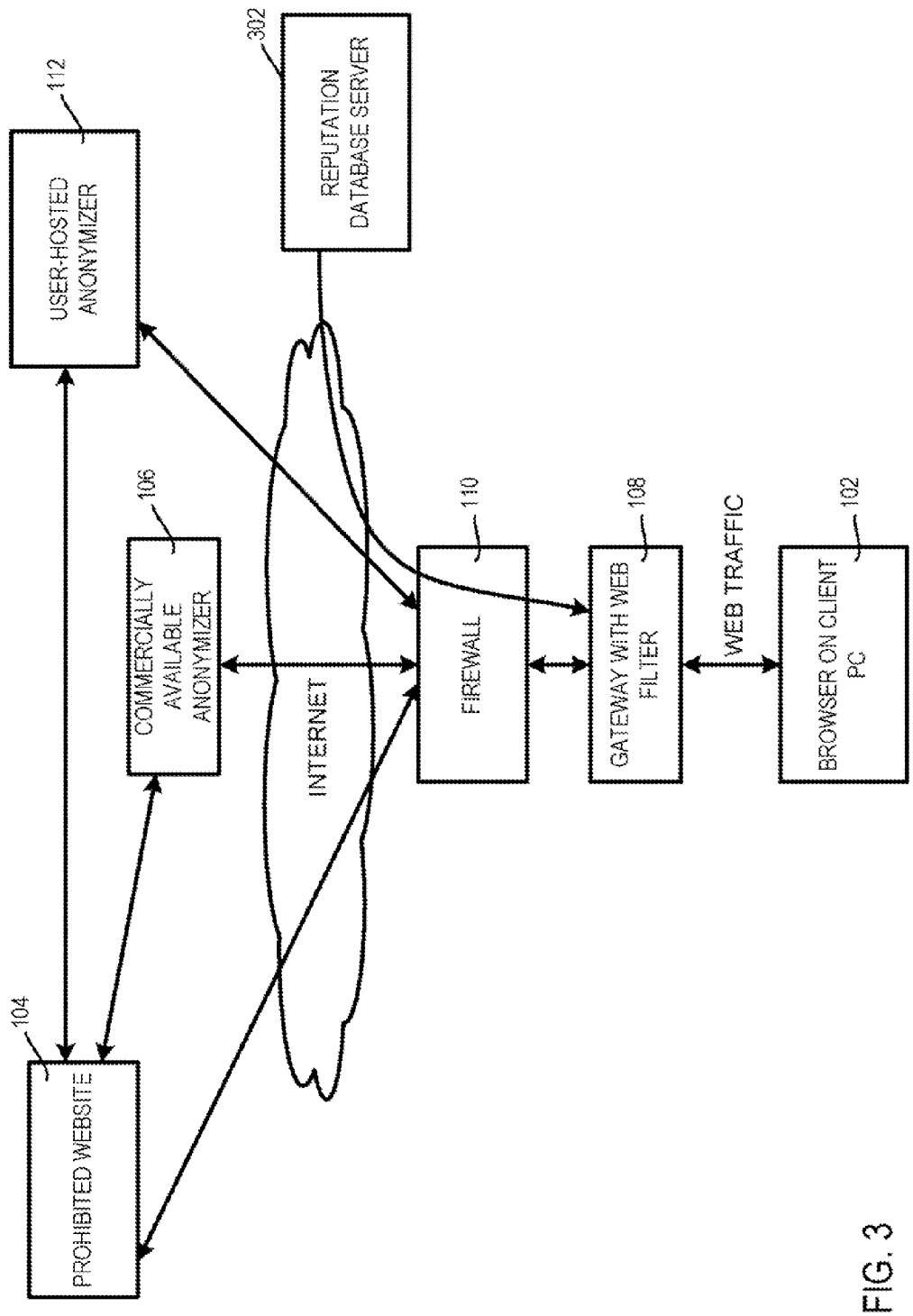
FIG. 3 shows, in accordance with an embodiment of the invention, a network environment for detecting anonymized traffic.

In an embodiment of the invention, the IP address of sites accessed by the user's browser is monitored. These IP addresses are looked up in a rating database, which tracks IP addresses that should be treated as suspicious if they act as web servers. Thus, in FIG. 3, the IP addresses of web servers accessed by the user's browser are looked up using a rating database 302. Generally speaking, the rating database may be thought of as a reputation database, which tracks IP addresses and rates them for their susceptibility to being employed as a temporary server.

For example, the rating database 302 may receive information about blocks of IP addresses that ISPs (Internet Service Providers) have assigned to PPPoE (Point-to-Point Protocol over Ethernet) users. As another example, rating database may track known spam IP addresses or may receive user input from other users regarding IP addresses of offensive web sites. In an embodiment, IP addresses associated with service levels unsuitable for e-commerce may be deemed suspicious.

If the IP address associated with the user's message is one of the IP addresses known by rating database 302 to be questionable, rating database 302 flags the IP address as being suspicious so that data exchanged with web servers at that IP address may be further examined as possible prohibited data.

FIG. 4 is a flow chart 400 illustrating, in accordance with an embodiment of the present invention, the steps for blocking anonymized traffic. The method of FIG. 4 may be performed alternatively or additionally to the method of FIG. 3.

In step 402, the IP addresses of the sites accessed by the user's browsers are monitored. For each new site, the IP address is looked up using the rating server (step 404). If the IP address is rated as being suspicious by the rating server, traffic exchanged with the web server associated with that IP address is flagged for further investigation (the "yes" path out of step 406).

Thus, in step 408, the connection is marked as suspicious. In an embodiment, all traffic associated with a suspicious connection is content-filtered (412) to ascertain whether the content is prohibited. By way of example, the gateway may perform filtering through the content to look for prohibited words or terms that may suggest that the content is offensive and should be prohibited. In another embodiment, other types of heuristics filtering or URL filtering or other type of processing may be performed to determine whether the traffic is prohibited.

If the traffic is ascertained to be prohibited (the "yes" branch out of block 414), enforcement and/or notification may be made. In an embodiment, the user and/or the administrator is informed of the failed attempt to access the prohibited material. In step 416, the IP address associated with the prohibited traffic is marked in the cache of the gateway so that future traffic from the same IP address may be blocked. Further, the rating server may be updated to reflect the fact that the IP address has been employed as a web server to transmit prohibited content. In this manner, the rating server may respond to a subsequent inquiry from the same or another user's browser regarding the IP address.

On the other hand, if the traffic is ascertained not to be prohibited (the "no" branch out of block 414), the connection is marked to be normal and data is sent to the client's browser (step 420), reflecting the fact that the data is not found to be anonymized data. The data is also sent to the client's browser (step 420) if it is found in step 406 that the rating server does not deem the IP address to be suspicious. Thereafter, control returns to step 402 to monitor the next message.

As can be appreciated from the foregoing, embodiments of the invention can detect anonymize attempts even if the user employs an anonymizer service (such as an anonymizing software on his home computer) that is not known to be an anonymizer website. Additionally, even if the anonymizer service encodes the URL of the destination website such that the URL no longer reflects the identity of the intended destination website, embodiments of the invention still can employ a rating server to detect suspicious connections to perform more in-depth analysis on the suspicious connections. In this manner, more of the anonymized traffic may be detected, giving the administrator more precise control over the ability of the user to access interne pages.

While this invention has been described in terms of several embodiments, there are alterations, permutations, and equivalents, which fall within the scope of this invention, it should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for detecting anonymized data traffic transmitted via a network device to a browser, said browser being implemented on a client device, the method comprising:
   using said network device to monitor browser-destined traffic, said browser-destined traffic being destined for said browser, said network device being external to said client device and being connected to said client device;
   determining, using said network device, whether said browser-destined traffic contains one or more HTTP 302 Moved messages;
   performing tasks based on at least a result of said determining;
   if said browser-destined traffic contains no HTTP 302 Moved message, allowing content data to be sent to said browser; and
   if said browser-destined traffic contains an HTTP 302 Moved message, parsing, using said network device, said HTTP 302 Moved message to identify at least an embedded website address, and ascertaining whether a website associated with said embedded website address is a prohibited website, said HTTP 302 Moved message including at least said embedded website address and a message-sending-website address, said HTTP 302 Moved message being sent by a message-sending server associated with said message-sending-website address, said message-sending server being external to said network device.

2. The method of claim 1 wherein said ascertaining includes performing URL filtering lookup on said embedded website address.

3. The method of claim 1 wherein said ascertaining includes looking up at least a portion of said embedded website address on a URL rating server.

4. The method of claim 1 wherein said ascertaining includes performing content filtering on data received from said website associated with said embedded website address.

5. The method of claim 1 further comprising blocking access to said message-sending server that transmitted said HTTP 302 Moved message.

6. The method of claim 1 wherein said parsing includes inspecting a "Location" field of said HTTP 302 Moved message.

7. The method of claim 1 wherein said parsing is performed in said network device.

8. The method of claim 1 wherein said network device is a network switching device and said detecting said anonymized traffic is performed in one of a desktop computer and a laptop computer.

9. An article of manufacture comprising a non-transitory program storage medium having thereon computer readable code for detecting anonymized data traffic transmitted via a network device to a browser, said browser being implemented on a client device, the article of manufacture comprising:
   computer readable code for using said network device to monitor browser-destined traffic, said browser-destined traffic being destined for said browser, said network device being external to said client device and being connected to said client device;
   computer readable code for determining whether said browser-destined traffic contains one or more HTTP 302 Moved messages;

computer readable code for performing tasks based on at least a result of said determining;

computer readable code for allowing content data to be sent to said browser if said browser-destined traffic contains no HTTP 302 Moved message;

computer readable code for parsing said HTTP 302 Moved message to identify at least an embedded website address and ascertaining whether a website associated with said embedded website address is a prohibited website if said browser-destined traffic contains an HTTP 302 Moved message, said HTTP 302 Moved message including at least said embedded website address and a message-sending-website address, said HTTP 302 Moved message being sent by a message-sending server associated with said message-sending-website address, said message-sending server being external to said network device; and circuits enabling one of more of said determining, said performing, said allowing, said parsing, and said ascertaining.

10. The article of manufacture of claim 9 wherein said computer readable code for ascertaining includes computer readable code for performing URL filtering lookup on said embedded website address.

11. The article of manufacture of claim 9 wherein said computer readable code for ascertaining includes computer readable code for looking up at least a portion of said embedded website address on a URL rating server.

12. The article of manufacture of claim 9 wherein said computer readable code for ascertaining includes computer readable code for performing content filtering on data received from said website associated with said embedded website address.

13. The article of manufacture of claim 9 further comprising computer readable code for blocking access to said message-sending server that transmitted said HTTP 302 Moved message.

14. The article of manufacture of claim 9 wherein said computer readable code for parsing includes computer readable code for inspecting a "Location" field of said HTTP 302 Moved message.

15. A computer-implemented method for detecting anonymized data traffic transmitted from servers to a browser, said browser being implemented on a client device, the method comprising:

using a network device to monitor browser-destined traffic, said browser-destined traffic being destined for said browser, said network device being external to said client device and being connected to said client device, said network device being external to said servers and being connected to said servers;

determining, using said network device, whether said browser-destined traffic contains one or more HTTP 302 Moved messages;

performing tasks based on at least a result of said determining;

if said browser-destined traffic contains no HTTP 302 Moved message, allowing content data to be sent to said browser; and if said browser-destined traffic contains an HTTP 302 Moved message, parsing, using said network device, said HTTP 302 Moved message to identify at least an embedded website address, and ascertaining whether a website associated with said embedded website address is a prohibited website, said HTTP 302 Moved message including at least said embedded website address and a message-sending-website address, said HTTP 302 Moved message being sent by a message-sending server associated with said message-sending-website address, said servers including said message-sending server, said message-sending server being external to said network device;

identifying IP addresses associated with said servers;

performing lookup of said IP addresses in an IP address rating database;

if said lookup reveals that one of said IP addresses is associated with suspicious traffic, flagging traffic associated with said one of said IP addresses as potential anonymized traffic;

ascertaining, using said network device, whether an IP address associated with said message-sending server is a dynamically allocated IP address; and scanning, using said network device, content received from said website associated with said embedded website address after ascertaining said IP address associated with said message-sending server is a dynamically allocated IP address and acts as a temporary server.

16. The method of claim 15 further including performing content filtering on data received from a server associated with said one of said IP addresses.

17. The method of claim 15 further comprising blocking access to a server associated with said one of said IP addresses.

18. The method of claim 15 further comprising updating said IP address rating database with information pertaining to said one of said IP addresses if a server associated with said one of said IP addresses is ascertained to be an anonymizing server.

19. The method of claim 15 further comprising ascertaining whether any IP address of said IP addresses is associated with a service level unsuitable for e-commerce.

* * * * *